US010070267B2

(12) United States Patent
Crook et al.

(10) Patent No.: US 10,070,267 B2
(45) Date of Patent: Sep. 4, 2018

(54) SYSTEMS, METHODS, AND APPARATUS FOR REVERSE GEOCODING

(71) Applicant: Verve Wireless, Inc., Carlsbad, CA (US)

(72) Inventors: Brian E. Crook, Encinitas, CA (US); Khoa Doan, Arlington, VA (US); Gary K. Ng, Carlsbad, CA (US); Chris G. Nicotra, Ashburn, VA (US); Marc J. Wrona, Lutherville, MD (US)

(73) Assignee: Verve Wireless, Inc., Carlsbad, CA (US)

( * ) Notice: Subject to any disclaimer, the term of this patent is extended or adjusted under 35 U.S.C. 154(b) by 0 days.

(21) Appl. No.: 15/213,092

(22) Filed: Jul. 18, 2016

(65) Prior Publication Data
US 2016/0330592 A1 Nov. 10, 2016

Related U.S. Application Data

(63) Continuation of application No. 14/656,374, filed on Mar. 12, 2015, now Pat. No. 9,396,210.

(51) Int. Cl.
G06F 17/30 (2006.01)
H04W 4/04 (2009.01)
G06Q 50/16 (2012.01)
H04W 4/02 (2018.01)

(52) U.S. Cl.
CPC ...... H04W 4/043 (2013.01); G06F 17/30241 (2013.01); G06Q 50/16 (2013.01); H04W 4/02 (2013.01)

(58) Field of Classification Search
CPC .............. G06F 17/3087; G06F 17/30241
See application file for complete search history.

(56) References Cited

U.S. PATENT DOCUMENTS

| 8,489,596 | B1 | 7/2013 | Milton et al. |
| 9,594,791 | B2 | 3/2017 | Bell et al. |
| 9,589,048 | B2 | 7/2017 | Milton et al. |
| 9,753,965 | B2 | 9/2017 | Rana et al. |
| 2004/0117255 | A1 | 6/2004 | Nemirofsky |
| 2011/0184945 | A1 | 7/2011 | Das |
| 2013/0269038 | A1 | 10/2013 | Takahashi |

(Continued)

OTHER PUBLICATIONS

Office Action for U.S. Appl. No. 14/656,374, dated May 5, 2015.
(Continued)

Primary Examiner — Hung Q Pham
(74) Attorney, Agent, or Firm — Cooley LLP

(57) ABSTRACT

Some embodiments described herein relate to reverse geocoding using, for example, real estate parcel data. In some embodiments one or more location records can be received, for example, from a location record database associated with a real estate mapping service. Each location record can identify or otherwise be uniquely associated with a closed shape, such as a two-dimensional polygon, circle, or other boundary that can, for example, define the metes and bounds of a real estate parcel. Geolocation data that represents a location of a mobile communication device can also be received. The geolocation data can map to a location within a shape and the location record associated with that shape can be selected. When the selected location record corresponds to a residential location, household data can be associated with that location record and/or the mobile communication device.

27 Claims, 4 Drawing Sheets

(56) References Cited

U.S. PATENT DOCUMENTS

2014/0236669 A1  8/2014  Milton et al.
2014/0237430 A1  8/2014  Thornberry et al.
2014/0279674 A1  9/2014  Michels et al.
2014/0310162 A1  10/2014 Collins

OTHER PUBLICATIONS

Office Action for U.S. Appl. No. 14/656,374, dated Oct. 1, 2015.
International Search Report and Written Opinion for International Application No. PCT/US2016/022083, dated May 2, 2016, 12 pages.

SYSTEMS, METHODS, AND APPARATUS FOR REVERSE GEOCODING

CROSS-REFERENCE TO RELATED APPLICATION

This application is a continuation of and claims priority to U.S. patent application Ser. No. 14/656,734 entitled "Systems, Methods, and Apparatus for Reverse Geocoding," filed Mar. 12, 2015, which is incorporated herein by reference its entirety.

BACKGROUND

Some embodiments described herein relate generally to systems, methods, and apparatus for reverse geocoding. For example, some embodiments described herein can enable geolocation data, for example, received from a mobile phone, to be associated with a real estate parcel and/or household address.

Reverse geocoding refers to correlating location data, such as Internet Protocol ("IP") addresses, cell-site location data, or latitude-longitude (lat-long) data to a point of interest, such as a state, city, neighborhood, etc. For example, existing techniques include using IP lookup tables to provide a rough estimate of the location of a computer requesting data, or identifying known landmarks, such as the Washington Monument or the White House, closest to received lat-long data, (e.g., a "reverse-GPS lookup"). Known reverse-GPS look up methods make use of general purpose mapping services, which are typically designed for roads and are not coded or not accurately coded with addresses. Therefore, known reverse-GPS look up methods are not able to reliably determine an address associated with the location. For example, some general purpose mapping services may only be coded with the block number (e.g., the 1100 block of 8th St.) and may return the middle of the block for any address on that block, or may divide the block into equal squares that do not accurately correspond to address on that block. While such methods may be suitable for providing driving directions, they are insufficient for associating GPS data with a household address. Because known reverse geocoding techniques do not possess sufficient accuracy and/or granularity to link location data to a household address, a need exists for improved methods to link location data to household addresses using, for example, real estate parcel data.

DETAILED DESCRIPTION

Figure 1:
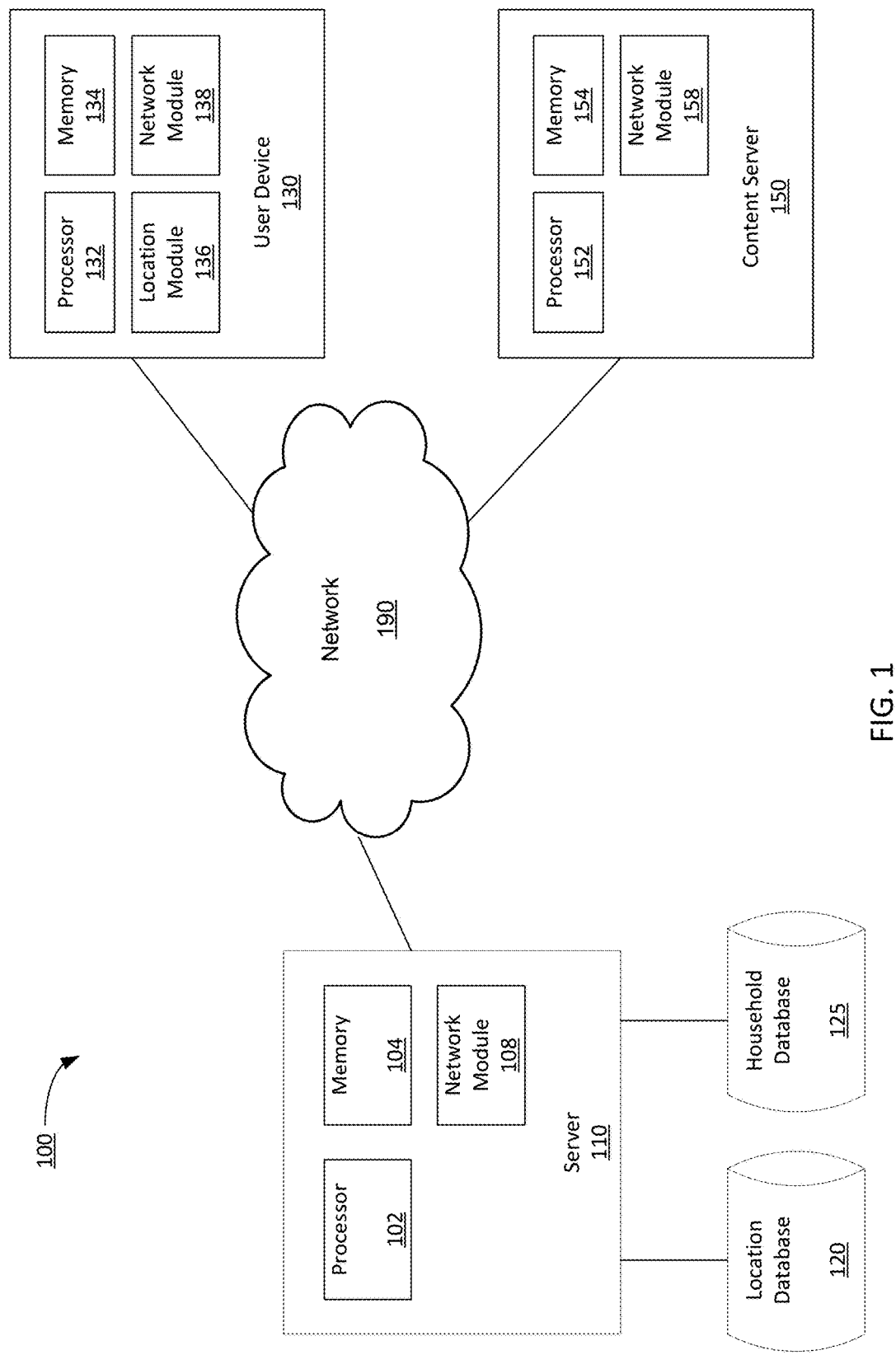
FIG. 1 is a schematic illustration of a system for associating mobile communication devices and real estate parcels, according to an embodiment.

Some embodiments described herein relate to reverse geocoding using, for example, real estate parcel data. In some embodiments one or more location records can be received, for example, from a location record database associated with a real estate mapping service. Each location record can identify or otherwise be uniquely associated with a closed shape, such as a two-dimensional polygon, circle, or other boundary that can, for example, define the metes and bounds of a real estate parcel. The location records can include information, such as lat-long data, defining the position and/or orientation of the shapes. Geolocation data that represents a location of a mobile communication device can also be received. The geolocation data can map to a location within a shape and the location record associated with that shape can be selected. When the selected location record corresponds to a residential location, household data can be associated with that location record and/or the mobile communication device.

Some embodiments described herein relate to advertisement attribution. One or more location records can be received, for example, from a location record database associated with a real estate mapping service. Each location record can identify or otherwise be uniquely associated with a shape that, for example, can be uniquely associated with a real estate parcel. Geolocation information that represents a location of a mobile communication device can also be received. For each item of geolocation information, a location record can be selected based on the geolocation information mapping to a location within the shape for that location record. Household data can be associated with each location record and/or the mobile communication device when a location record corresponds to a residential location. Information, such as an advertisement or content (e.g., a webpage, a webpage customized for that user, a news article, an email, etc.) can be sent to each mobile communication device based on the household data associated with the location record and/or the mobile communication device. The effectiveness of the information sent to the mobile communication devices can measured based on transaction records associated with the location records. For example, once the mobile communication device is associated with household data, which can include credit card records, it can be possible to determine whether someone in the household purchased an item associated with the information sent to the mobile communication device. Such a conversion can be reported, for example, to an advertiser, who may provide incentive payments when a conversion occurs.

Some embodiments described herein relate to providing insights into consumer behavior. One or more location records can be received, for example, from a location record database associated with a real estate mapping service. Each location record can identify or otherwise be uniquely associated with a shape that can be uniquely associated with a real estate parcel. Geolocation information that represents a location of a mobile communication device can also be received. For each item of geolocation information representing a location of a mobile communication device, a location record can be selected based on the geolocation information mapping to a location within a shape for that location record. Household data can be associated with each location record and/or the mobile communication device (and/or a mobile communication device ID associated with the mobile communication device) when a location record corresponds to a residential location. Common characteristics of households can be identified from the household data, for example, based on transaction records associated with the household data. These common characteristics can provide insight into consumer behavior and can be used, for example, to target traditional (e.g., direct mail) and/or internet advertising. Similarly stated, based on the common characteristics, which can be derived, at least in part, from both mobile communication device location data and household data, patterns and/or propensities of users of mobile communication devices can be calculated. This insight into consumer behavior can be expressed in terms of whether a particular user of a mobile communication device is likely to have an interest in a particular product or category of products. For example, users of mobile communication devices can be ranked based on a calculated interest in a product. Highly ranked users can be prime prospects for receiving information associated with that product. A signal identifying these highly ranked users can be sent to a content provider such that direct mail can be sent to household addresses and/or content and/or advertisements can be sent to mobile communication devices.

Some embodiments described herein relate to household data and/or correlating location data to household data. Household data as discussed herein generally refers to, for example, the significant quantity of consumer data, such as data on consumer incomes, demographics, purchasing behavior, media consumption, etc. have been assembled by market research firms such as the Nielson company for many years. Market research firms developed their data structures in the pre-internet age and typically index consumer behavior based on household address. These market research firms traditionally catered to clients such as direct mail marketers, advertisers placing ads in print media such as magazines or newspapers, telemarketers who would dial landline numbers uniquely associated with an address, etc. Modern content delivery and advertising techniques have arisen that are more difficult to associate with a household address, particularly for prime demographic targets. For example, a marketer wishing to target millennials may have difficulty obtaining data on individuals who do not possess landline telephones, may not subscribe to cable television, newspapers, or magazines, and who consume significant media via mobile devices. Despite changing media consumption habits, the rise of "big data" and development of powerful predictive models has made the databases maintained by market research firms more valuable than ever. Some embodiments described herein are related to unifying this household address-indexed data with data associated with a mobile communication device, an identifier associated with the mobile communication device, or a user of the mobile communication device.

FIG. 1 is a schematic illustration of a system 100 for associating a user device 130 to one or more real estate parcels, according to an embodiment. The system 100 includes a server 110, the user device 130, and a content server 150, communicatively coupled via a network 190. The network 190 can be any communication network or combination of networks capable of transmitting information (e.g., data and/or signals) and can include, for example, the Internet, an intranet, a telephone network, an Ethernet network, a fiber-optic network, a wireless network, and/or a cellular network.

The user device 130 can be any suitable computing entity (also referred to herein as a "compute device," such as a mobile communication device (e.g., a cell phone, a smart phone, a tablet computer, a laptop computer, etc.), a desktop computer, or similar device. The user device 130 includes a processor 132, a memory 134, a location module 136, and a network module 138. The processor 132 can be, for example, a general purpose processor, a Field Programmable Gate Array (FPGA), an Application Specific Integrated Circuit (ASIC), a Digital Signal Processor (DSP), and/or the like. The processor 132 can be configured to retrieve data from and/or write data to memory, e.g., the memory 134, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The network module 138 can be a wired and/or wireless transceiver module operable to communicatively couple the user device 130 to the network 190. For example, the network module 138 can be a wired and/or wireless network interface controller (MC), a cellular telephone module, a Bluetooth® module, a ZigBee® module, ultrasonic, magnetic and/or any other suitable module configured to send and/or receive signals via the network 190. The location module 136 can be a GPS module or any other suitable hardware and/or software module (e.g., executing on a processor) operable to determine the location of the user device 130. Data associated with a location of a compute device, such as the user device 130, is referred to herein as "geolocation data."

The server 110 can be a computing entity operable to associate compute devices such as the user device 130 with location records. The server 110 includes a processor 102, a memory 104, and a network module 108. The processor 102, the memory 104, and the location module 106 can each be structurally and/or functionally similar to the processor 132, the memory 134, and/or the location module 136.

As discussed in further detail herein, the server 110 can be operable to receive geolocation information (e.g., from the user device 130 via the network 190), location records (e.g. from a location database 120), and/or household data (e.g., from a household database 125). The server 110 can further be operable to associate compute devices (such as the user device 130) with a location (e.g., from the location database 120) and/or household data (e.g., from the household database 125). Although FIG. 1 depicts the location database 120 and the household database 125 as distinct devices, it should be understood that the location database 120 and/or the household database 125 can be physically and/or logically part of the memory 104.

The location database 120 can store location records, such as real estate parcel data, shopping mall map data, high-rise building directory data, etc. The location data can include multiple location records, such as a location record for each real estate parcel in an area (e.g., a block, a zip code, a city, a county, etc.), a location record for each tenant in a shopping mall, a location record for each tenant and/or floor of a high rise building, etc. Each location record can, for example, be a two-dimensional or three-dimensional shape associated with a location, such as the metes and bounds of a real estate parcel, a 3-dimensional structure associated with a footprint and height of an office space, the boundaries of a road or highway, an area extending into the sea (e.g., an area including a portion of a beach or port and/or a portion of the sea), and so forth. The server 110 can associate geolocation data to location records. In some instances, the server 110 can associated the user device 120 with a residential location (e.g., a household) based on geolocation data from the user device 120 matching to a parcel in a real estate database. In another instance, the server 110 can associate the user device 120 with a commercial location based on geolocation data from the user device 120 matching to a store in a directory of an office park or shopping center. In yet another embodiment, the server 110 can associate the user device 120 with an apartment or office based on geolocation data including altitude information from the user device 120 matching to a directory of a multi-story building. Similarly stated, the server 110 can associate the user device 120 with one or more location records based on geolocation data received from the user device 120.

In some embodiments, the server 110 can be operable to associate household data with compute devices (e.g., the user device 130), for example, based on the compute devices being associated with location records. For example, mobile communication devices, which do not typically send or receive data suitable to associate the mobile communication device with a household address, can be linked to a household address based on the location records. Then, household data, which is traditionally indexed by household address, can be linked to the mobile communication device. In this way, data collected by market research firms, such as household income, household tax data, household composition, household demographics, etc. can be tied to or associated with the mobile communication device. Furthermore, in some embodiments, purchase information, such as credit card and/or bank activity data can be tied to or associated with the mobile communication device.

In some instances, the server 110 can be operable to associate household data with compute devices (e.g., the user device 130) in a manner that protects and/or enhances user privacy. For example, a temporary key can be assigned to a location record and aggregate household data (e.g., demographic buckets, product preferences, nearby points of interest or merchants) and/or aggregate online activity (e.g., a record of product announcements, click data, etc.) can be associated with the key. In this way, the server 110 can be operable to associate household data with compute devices based on a match to aggregated data. Similarly stated, the server 110 can be operable to associate household data with compute devices without defining a 1:1 match between sensitive household data and a user device.

The content server 150 can be any suitable device operable to send content to the user device 130 and/or a physical address. For example, the content server 150 can be a web server operable to serve content to the user device 130, an advertiser server operable to serve advertisements to the user device 130, or advertising exchange operable to broker advertisement placement on the user device 130. As another example, the content server 150 can be associated with a retailer and/or direct mail provider and can be operable to determine that direct mail such as flyers, catalogs, etc. should be mailed to a physical address. Similarly stated, the content server 150 can be operable to add a physical address to a distribution list that will be used for targeted mailings.

In some embodiments, the content server 150 can be operable to select information to be sent to the user device 130 and/or a physical address based, at least in part, on the user device 130 being associated with a particular location (which can additionally be associated with household data). For example, based on the user device 150 being associated with an address, the content server 150 can send an advertisement to the user device 150 related to a nearby pizza restaurant. As another example, based on data received, for example, from the server 110, indicating that the user device 130 has visited webpages associated with home decorating, the content server 150 can cause a catalog for a home furnishing company to be sent to an address associated with the user device 130 via the postal service.

The content server 150 includes a processor 152, a memory 154, and a network module 158, each of which can be structurally and/or functionally similar to the processor 132, the memory 134, and/or the network module 138, respectively.

Figure 2:
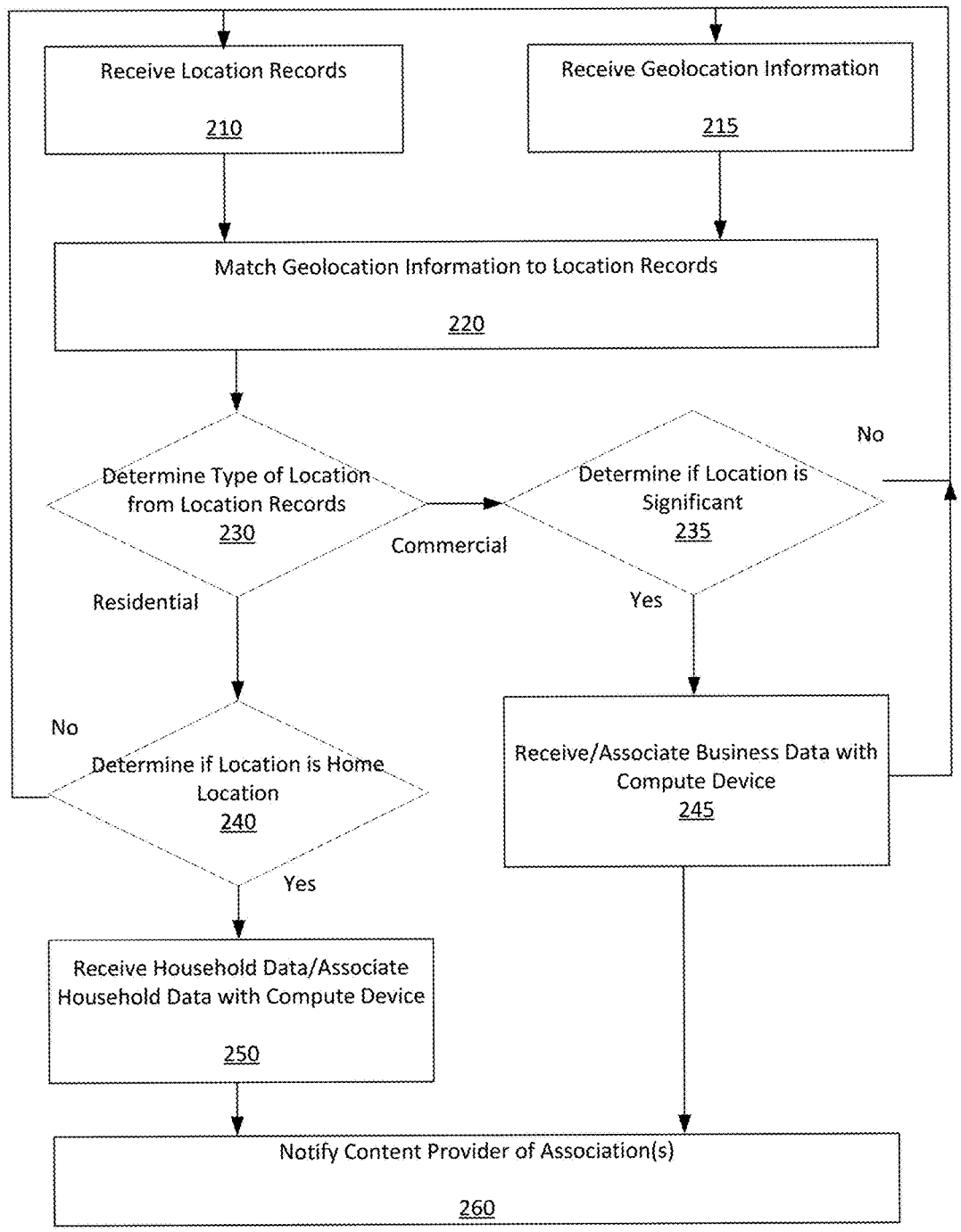
FIG. 2 is a method of associating geolocation information to location records, according to an embodiment.

FIG. 2 is a flow chart of a method of associating geolocation data to location records, according to an embodiment. The method shown in FIG. 2 and described herein can, in some instances, be executed by the server 110 (e.g., stored in the memory 104 and/or executed on the processor 102) shown and described with reference to FIG. 1.

Figure 3A:
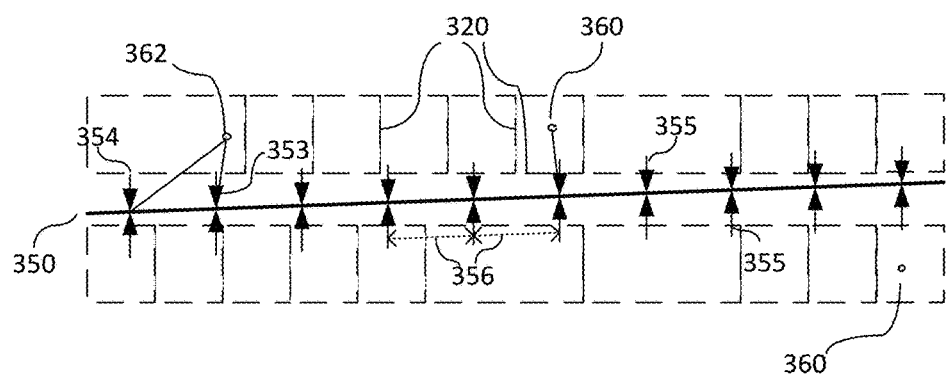
FIG. 3A is an illustration of a known method of reverse geocoding.
Figure 3B:
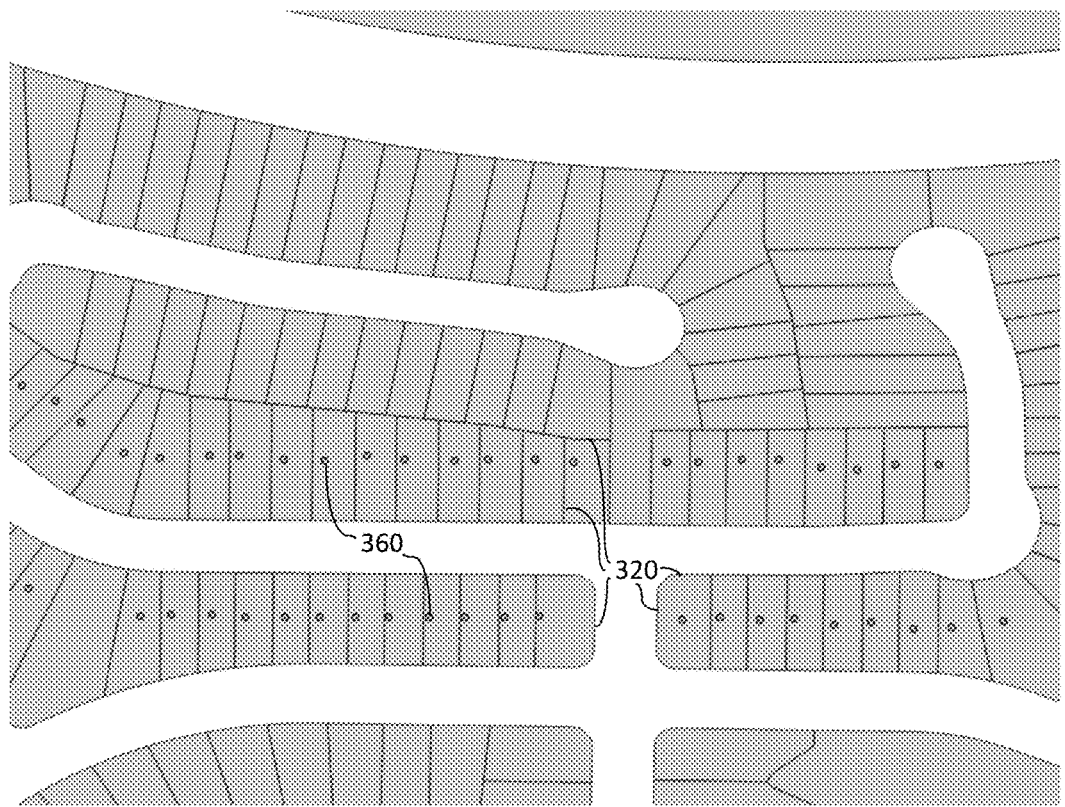
FIG. 3B is an illustration of a method of reverse geocoding, according to an embodiment.

Location records can be received at 210 and geolocation information can be received at 215. For example, location records can be received from the location database 120 as described above with reference to FIG. 1. The location records can include information representing polygons, polyhedra, or any other closed shape, each uniquely representing a geographic area, such as real estate parcels, office spaces, etc. For example, as shown in FIG. 3B, the location records can include parcel boundaries 320. In contrast, as shown in FIG. 3A, known location data typically used for reverse geocoding has been a point location or vector 355 that represents street addresses; the point locations or vectors 355 are typically equally spaced 356 along a line 350 representing a road.

Figure 4A:
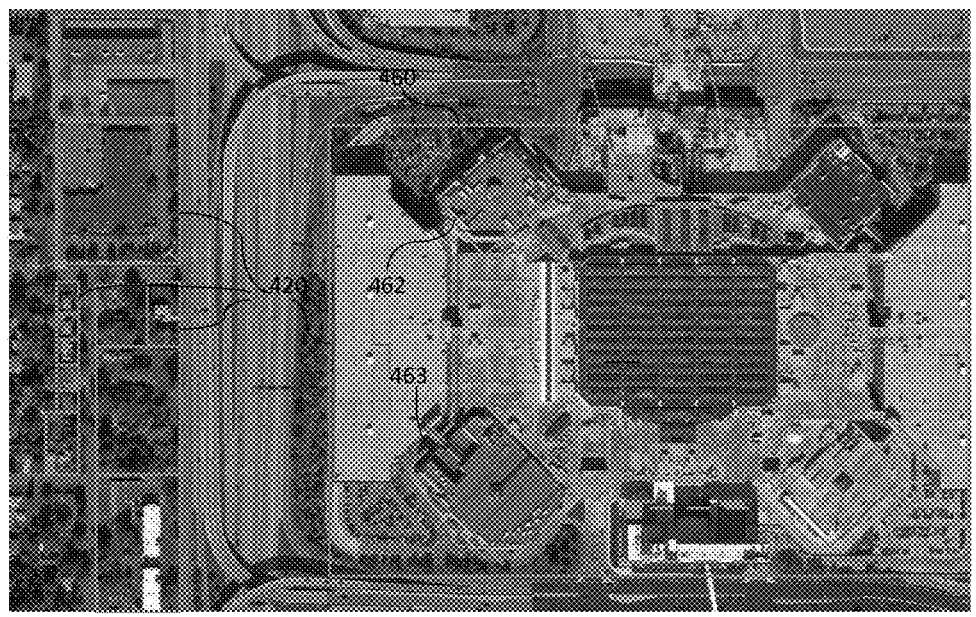
FIG. 4A is an aerial photograph including a shopping mall.

In addition or alternatively, aerial and/or satellite imagery of region can be received. Image recognition techniques and/or location records received at 210 can be used to identify parcels or buildings. For example, as shown in FIG. 4A, parcel boundaries 420 can be can be superimposed over an aerial image based on location records received at 210. Image processing techniques can be applied to detect roofs or other features (e.g., roads, fields, etc.) when a parcel is identified as a commercial parcel (e.g., when the location records received at 210 include an indication that the parcel is commercial), when a parcel has multiple structures, and/or when a parcel is larger than a predetermined size. For example, parcel 460 is a large commercial parcel containing a shopping mall having more than one structure and more than one roof. Polygons 462, 463, within parcel 460 can be defined based, for example on detecting an edge of a roof. Roof identification can be applied to distinguish between multiple structures on a single parcel. For example, an office park or shopping mall may include multiple buildings on a single real estate parcel such that a single business may not be uniquely associated with the parcel. Roof identification can effectively subdivide parcel data 460 such that polygons 462, 463 can be defined for each structure within real estate parcel 460. In some instances each polygon 462, 463 associated with a structure, rather than a real estate parcel 460, can then be uniquely associated with a business or home. In some embodiments, roof identification can be performed only if aerial imagery reveals multiple structures on a parcel, only if an aerial imagery reveals multiple structures on a business or commercial parcel (e.g., such that residential garages, barns, etc. are not subdivided from parcel data), only if the parcel is a non-residential parcel, and/or only if a parcel is greater than a threshold size.

Figure 4B:
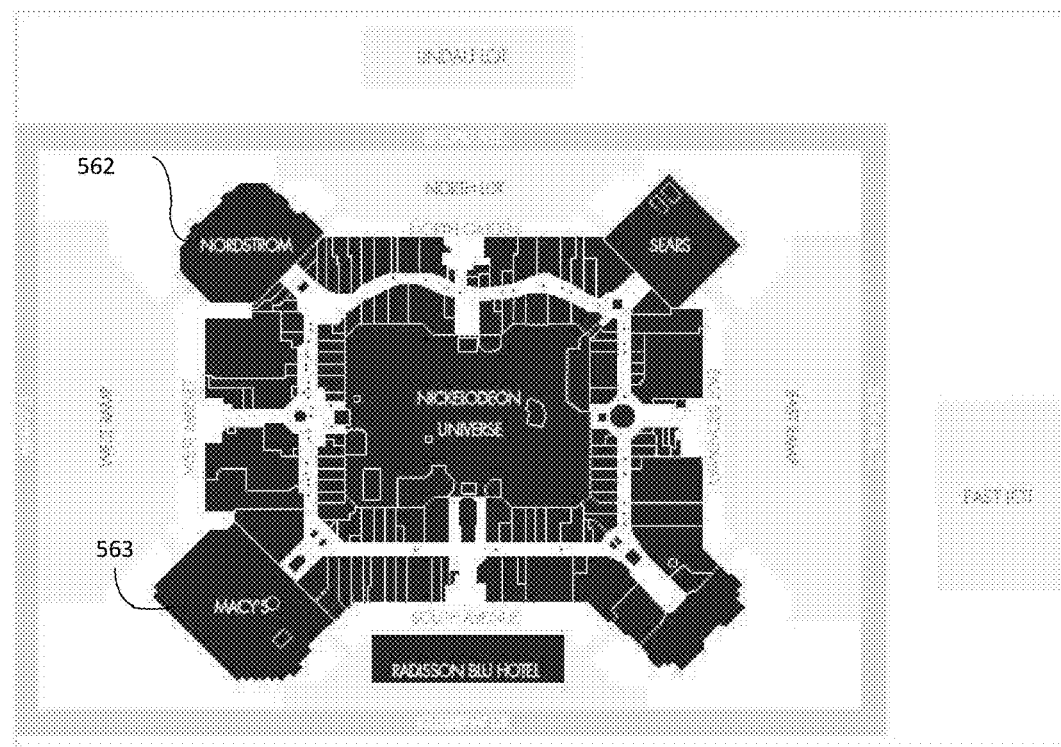
FIG. 4B is a directory of the shopping mall of FIG. 4B.

In some instances, the location data received at 210 can include directory information, for example, when a real estate parcel includes more than one structure and/or more than one business. FIG. 4B, for example, is a directory of the shopping mall within parcel 460. As shown, the directory identifies structure 562, which corresponds to polygon 462, as "Nordstrom" and structure 563, which corresponds to polygon 463, as "Macy's." Accordingly, polygons 462 and 463 can be associated with "Nordstrom" and "Macy's," respectively.

The geolocation information received at 215 can indicate that a mobile communication device (e.g., the user device 130) was at one or more locations. The location data can be, for example, as illustrated in FIGS. 3A and 3B one or more lat-long pairs indicting a specific geographic location 360.

As described in further detail herein, the method shown in FIG. 2 can be iterative, parallelized, or otherwise operable to process multiple location records and/or geolocation information. For instance, the geolocation information received, at 215, can include multiple records of the mobile communication device, each record indicating that the mobile communication device has been at a different location at a different time. Each geolocation record can be compared against a database of location records sequentially. Alternatively, the geolocation data can be compared against a database of location records in parallel, and/or any suitable modeling technique can be used to ascertain patterns, relationships, and/or any other suitable behaviors. For example, as described in further detail herein, a modeling technique can be operable to identify the user of the mobile communication device's home, workplace, commonly-visited retail establishments, common commuting patterns, most frequently-visited gas station, commonalities between mobile communication devices based on patterns of geolocation information, and so forth.

At 220, a geolocation record received at 215 can be matched to a location record received at 210. For example, as shown in FIG. 3B, if a location 360 represented by a lat-long pair falls within a polygon 320 representing a real estate parcel, the geolocation record associated with that lat-long pair can be associated with the location record associated with that real estate parcel. Similarly, if a latitude-longitude-altitude triplet falls within a polyhedron associated with a space in a high-rise building (e.g., an apartment on 8th floor of an apartment building), that triplet can be associated with that apartment.

As compared to this method, known methods of using address data for reverse geocoding, such as illustrated in FIG. 3A may produce significant inaccuracies. Parcel boundaries 320 are illustrated as dashed lines in FIG. 3A to illustrate inaccuracies associated with known methods; known methods, however, do not make use of parcel boundary data. For example, because the line 350 representing the street only roughly approximates parcel boundaries, because parcels may not be equally spaced along the line 350, because house numbering may be nonstandard (e.g. not incrementing consistently by 2), and because vectors 355 are generally associated with the line 350 representing the street, rather than a parcel boundary, the closest vector 355 to a received location 360 may not represent the address of the parcel containing the location 360. For example, location 362 is closest to vector 353, but is actually associated with the address represented by vector 354. In some instances, errors associated with matching a lat-long pair to an address, as illustrated in FIG. 3A or using similar means can be greater than 10%, greater than 15%, or greater than 25%. In some instances matching a geolocation record received at 215 to a location records received at 210 including parcel boundaries, as illustrated in FIG. 3B, can be greater than 95% accurate, greater than 98% accurate, greater than 99% accurate, and so forth.

At 230, the method can include determining whether the location information matched to the geolocation record is a commercial location or a residential location. For example, real estate parcel data, which can be received at 210, can include zoning information, property use data, etc.

If the location is a residential location, the method can include determining if the location is a home location, at 240. A home location can identified or determined, for example, based on the location the user of the mobile communication device spends the most time, the location at which the user of the mobile communication device consumes the most content, the location the user of the mobile communication device receives bills, and so forth. In some embodiments, a model of at-home content consumption can be defined. For example, at home a user may be more likely to consume more content and/or content associated particular activities such as golf, celebrity news, video games, television programming, movie schedules, etc., than at other locations (e.g., at work, at a family member's home, etc.) Content consumption patterns at the location can be compared to a pre-defined model of at-home content consumption. In some instances, the location can be determined to be a home location, at 240, if a parameter comparing the content consumed at that location to a pre-defined model of at-home content consumption exceeds a threshold level. In other instances, the location can be determined to be a home location, at 240, if that location most closely matches the at-home content consumption model for that mobile device than any other location associated with the mobile device.

A location can be determined to be a home location, at 240, based on heuristics such as a time associated with the geolocation information, the number of times the mobile communication device has been to the location, etc. As an illustration, the method can determine that a location is a home location, at 240, if the mobile communication device spends more time at the location than any other location, if the geolocation information is received during the evening or at night, if a pattern of geolocation data indicates the mobile communication device has traveled from a commercial location (which can be associated with a workplace) to a residential location, and/or so forth. If the method determines that the location is the home location, at 240, the mobile communication device can be linked or otherwise associated with that location. For example, the server 110 can determine that the user device 130 is uniquely associated with that home location. In some embodiments, the server 110, upon determining that a location is a home location of the user device 130, can be operable to associate the user device 130 with a street address for that location.

If the method determines that the location is not the home location, the method can iterate or attempt to determine whether any other records of geolocation data received at 215 correspond to the user's home by any other means. Similarly stated, a new location record can be received at 210, and/or new geolocation information can be received at 215, and the method can repeat such that, for example, a new geolocation data point can be matched to a new location record, at 220, the type of location can be determined at 230, and that new location can be evaluated to determine if it is a home location, at 240.

At 250, household data can be received and/or associated with the mobile communication device and/or the location information. Once it is determined that a location is a home location, at 240, the mobile communication device can be linked to the address, which can in turn be linked to household data indexed by address. In this way, data associated with the mobile communication device, such as information that a particular piece of content, such as an advertisement, a catalog, a product review, etc. has been viewed by the mobile communication device can be linked to and/or compared against the household data. For example, using these association(s), the server 110 and/or the content server 150 can be operable to determine based on credit card data or the like that a household purchased a item that was featured in content viewed by the mobile communication device. In this way, traditionally disparate types of data (e.g., mobile communication device activity data and household data) can be unified. Such unification of data can be used to provide additional consumer intelligence and can be used, for example, to select content for display to users of the mobile communication device, select direct mail content to be provided to the household, provide incentive payments to advertisers for advertisement conversion, and so forth.

At 260, the server 110 can send a signal to a content provider to notify the content provider of the association(s) between the mobile communication device, the location, the household, and/or the household data. For example, the server 110 can receive household data for the address determined to be a home location at 240 from the household database 125. The household data can include, for example, credit card billing data, demographic data, tax data, income information, and so forth. The household data can, in some instances, be indexed by address.

Returning to 230, if it is determined that the location matched to a geolocation data at 220 is a commercial location, the method can proceed to determine if the location is significant, at 235. The significance of the place represented by the geolocation data can be a measure of the likelihood that the place has meaning to the user of the geolocation device. For example, the geolocation information, in some instances, can include a data stream representing large portions of the mobile communication device's movements over the course of hours, days, months, or even years. A location that appears once in the geolocation data may not have meaning to the user. Such a location may appear if, for example, the user of the mobile communication device walks or drives by a commercial location, stops briefly at a commercial location, etc. For example, an insignificant location might be a shop in a strip mall the user walked by or briefly visited. Conversely, a significant location may represent a location having important meaning to the user of the mobile communication device. For example, the method can determine that a commercial location in which the user spends approximately eight hours a day, five days a week is significant. Such a location may represent the user's place of work or business. While these two illustrations (a single location visited briefly, and a place of work) represent extremely insignificant and extremely significant locations, respectively, it should be understood that locations can have a wide range of significance. For example, a coffee shop visited by the user of the mobile communication device twice a week or twice a month may be determined to be significant, at 235.

In some embodiments, a significance score can be assigned to a location, at 235. The significance score can be calculated based on the number of times the location appears in the geolocation information, the length of time spent at the location, the frequency with which the location appears in the geolocation information, and so forth. In some embodiments determining when a location is significant, at 235, can include determining if a significance score is over a threshold and/or determining a number of the most significant locations in the geolocation information (e.g., the most frequently visited locations, the locations where the most content is consumed, etc.).

Determining that a location is not significant, at 235, can reduce computational burdens associated with the method shown in FIG. 2 and can prevent spurious locations from being linked to the mobile communication device. For instance, little or no meaning may be derived from some insignificant locations. If a location is determined to be insignificant, at 235, the method can return to 210 and/or 215 and iterate or process the location data such that other locations can be evaluated for significance.

If, at 235, the location is determined to be significant, it can be an indication that meaningful inferences can be drawn from the mobile communication device having been at that location. For instance, a significant commercial location may reveal that the user of the mobile communication device shops, works, visits, or otherwise has an interest in that location. The fact that the user of the mobile communications has an interest in a particular location can, for example, be of interest to advertisers or content providers who may wish to tailor content to users based on places they have been. For instance, an advertiser may wish to send an advertisement to users who have more than a passing interest in specific commercial locations. Determining that a location is significant, at 235 can indicate that the user has more than a passing interest in that commercial location.

At 245, business data associated with the location determined to be significant at 235 can be received and/or associated with the mobile communication device. Business data can include, for example, the name of the business associated with the location, the category of the business associated with the location (e.g., retail, food, gas, etc.), information such as the demographics of the clientele of the business, the revenue of the business associated with the location, and so forth.

At 260, a content provider and/or data aggregator can be notified of the association between the mobile communication device and the significant commercial location and/or business data. For example, the server 110 can send a signal to the content server 150 and/or a data aggregator including information of such association(s). Using this information, the content provider may be able to tailor content based on the interests of the user of the mobile communication device. For instance, a jewelry designer may wish to provide content to a user who has visited high-end boutiques, contractor may wish to provide content to a user who has visited a home-improvement store, one business owner may wish to provide content to a user who has visited the business' competitor, and so forth. As discussed above, in some instances, determining if the commercial location is significant at 235 can be useful to the content provider, such that the content provider does not expend resources tailoring its activities to "false-positives," such as users who have had limited exposure to the location.

In some embodiments, a content provider can be notified, at 260, that the mobile communication device is associated with both (1) a home location and/or household data and (2) a commercial location and/or business data. For example, a content provider can be notified, at 260, that a user having a home in a targeted residential area (e.g., an physical neighborhood to which the content provider is interested in sending product announcements) was seen at and/or near a targeted commercial location (e.g., a chain of retailers). In some instances, actual home location information, such as a physical address, may be not be revealed to content providers to protect and/or enhance the privacy of users. In such an instance, genericized and/or aggregate data can be provided to the content provider.

Although not shown in FIG. 2, in some embodiments, the content provider can develop and/or provide custom content to the user after being notified of association(s) between any of a mobile communication device, a home location, household data, a commercial location, and business data. For example, the content provider can develop and/or send direct mail, internet advertisements, customized news stories, etc.

In some instances, a data aggregator can be notified of association(s) at 260, such that the data aggregator, which may have access to internet browsing data, can associate advertisements sent to the mobile communication device, content sent to the mobile communication device, shopping habits associated with the mobile communication device (e.g., online or real-world), etc. with the home location and/or household data such as purchase activity and household composition. In some instances, household data and/or purchase activity can be derived and/or genericized data. For example, if a user associated with the mobile communication device purchases a $5,000 computer from Best Buy®, the data aggregator can be notified only that the mobile communication device was associated with a large electronics purchase. That is, the data aggregator may not be notified of all the specifics of purchase activity and/or household data.

In other instances, a data aggregator can be notified of association(s) at 260, such that the data aggregator can identify commonalities between households based on geolocation data and/or significant commercial locations. For example, a data aggregator can be operable to identify and link mobile communication devices that have visited a common location (e.g., a business), have a pattern of common geolocation data, have common internet browsing activity, have a pattern of engaging in similar ecommerce transactions, etc. The data aggregator can then identify the households associated with each of the linked mobile communication devices. The data aggregator can then search for commonalities or patterns between household data such as transaction records associated with the linked mobile communication devices. In this way, richer and/or different data sources can be leveraged to provide greater insight into consumer behavior than is typically available when consumer behavior is modeled based only on data associated with a mobile communication device.

While various embodiments have been described above, it should be understood that they have been presented by way of example only, and not limitation. Where methods described above indicate certain events occurring in certain order, the ordering of certain events may be modified. Additionally, certain of the events may be performed repeatedly, concurrently in a parallel process when possible, as well as performed sequentially as described above. Although various embodiments have been described as having particular features and/or combinations of components, other embodiments are possible having a combination of any features and/or components from any of embodiments where appropriate as well as additional features and/or components. For example, although some embodiments describe "lat-long" data, any suitable location data (e.g., latitude, longitude, altitude data), distance and direction from a reference point, and/or so forth can be used. As another example, although determining whether a location is significant is described with reference to commercial locations, in other embodiments the significance of all locations and/or residential locations can be evaluated for significance in addition or as an alternative to evaluating commercial locations for significance.

As another example, some embodiments described herein can include techniques to protect user privacy. For instance, when geolocation data is received, it can be received with an anonymous identifier, rather than an identifier personally identifying the user of the mobile communication device. Similarly, when household data is sent to a content provider and/or data aggregator, such household data may not include geolocation information or an identifier for the mobile communication device, such that the content provider does not obtain direct access to location history of the mobile device. Furthermore, in some instances different computing entities can perform different operations, such that no one computing entity has access to a complete set of geolocation information, location records and household data etc. For example, a first computing entity can select location records associated with geolocation records and send those location records to a second computing entity. That second computing entity can access household data associated with those locations and optionally send household data (e.g., demographics, credit card purchase data, etc.) back to the first computing entity.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes including for example some or all of the processes and methods described above. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RANI devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor readable medium storing code representing instructions configured to be executed by a processor, the code comprising code to cause the processor to:
   receive, at a compute device, information representing a latitude-and-longitude of a mobile communication device;
   access a location database that stores a plurality of location records, each location record from the plurality of location records uniquely associated with a closed shape from a plurality of closed shapes, each closed shape from the plurality of closed shapes uniquely associated with a geographic area from a plurality of geographic areas;
   select, at the compute device, a first location record from the plurality of location records based on the latitude-and-longitude mapping within a first closed shape with which the first location record is uniquely associated;

associate, at the compute device, the mobile communication device with a first geographic area from the plurality of geographic areas associated with the first location record;

access a consumer behavior database storing a plurality of records indexed by geographic area, a first record from the plurality of records including an indication of the first geographic area;

associate, at the compute device, the mobile communication device with the first record; and provide, to a content provider device, an indication of the association between the mobile communication device and the first record, wherein the content provider device can target content to the mobile communication device based on the indication of the association between the mobile communication device and the first record.

2. The non-transitory processor readable medium of claim 1, wherein each closed shape from the plurality of closed shapes represents at least one of metes and bounds of a real estate parcel, a 3-dimensional structure associated with a footprint and height of an office space, boundaries of a road or highway, an area extending into the sea, or a footprint of a leased space in a multi-tenant structure.

3. The non-transitory processor readable medium of claim 1, the code further comprising code to cause the processor to:

receive an indication of content consumed via the mobile communication device, the association between the mobile communication device and the first record being an indication that a purchase associated with the first geographic area is associated with the content consumed via the mobile communication device.

4. The non-transitory processor readable medium of claim 1, the code further comprising code to cause the processor to:

receive a plurality of geolocation information representing a plurality of locations of the mobile communication device, the information representing latitude-and-longitude of the mobile communication device being from the plurality of geolocation information;

calculate a significance score for the first location record based on a number of locations from the plurality of locations mapping within the first closed shape;

determine that the first location record is significant based on the significance score exceeding a predetermined threshold; and provide, to the content provider device, an indication that the first location record is significant.

5. The non-transitory processor readable medium of claim 1, wherein each geographic area from the plurality of geographic areas is uniquely associated with a street address from a plurality of street addresses.

6. The non-transitory processor readable medium of claim 1, wherein the information representing the latitude-and-longitude of the mobile communication device is a first latitude-and-longitude from a plurality of latitude-and-longitudes of the mobile communication device over a period of time, the code further comprising code to cause the processor to:

define a significance score for the first geographic area based on at least one of (1) a time stamp indicating when the first latitude-and-longitude was determined or (2) a number of latitude-and-longitudes from the plurality of latitude-and-longitudes mapping within the first closed shape.

7. The non-transitory processor readable medium of claim 1, the code further comprising code to cause the processor to:

receive an indication of information received by the mobile communication device; and measure an effectiveness of the information sent to the mobile communication device based on the first record.

8. The non-transitory processor readable medium of claim 1, wherein the information representing the latitude-and-longitude of the mobile communication device is from a plurality of location signals, each location signal from the plurality of location signals representing a latitude-and-longitude of the mobile communication device, the code further comprising code to cause the processor to:

receive information representing a plurality of information consumed by the mobile communication device over a period of time; and determine that the first geographic area is a home location of the mobile communication device based on a subset of the plurality of information consumed being associated with a subset of the plurality of location signals that map within the first closed shape, the subset of the plurality of information consumed corresponding to at least one of a predetermined home consumption time or a predetermined home information consumption pattern.

9. The non-transitory processor readable medium of claim 1, wherein:

the information representing the latitude-and-longitude of the mobile communication device is from a plurality of location signals, each location signal from the plurality of location signals representing a latitude-and-longitude of the mobile communication device, the code further comprising code to cause the processor to:

determine, based on a pattern of the plurality of location signals, that the first location record is a significant location record; and provide, to the content provider device, an indication that the first location record is significant such that the mobile communication device is not associated with geographic areas when a location record is not a significant location record.

10. The non-transitory processor readable medium of claim 1, the code further comprising code to cause the processor to determine that the first geographic area is associated with a commercial location.

11. The non-transitory processor readable medium of claim 1, wherein:

the information representing the latitude-and-longitude of the mobile communication device is from a plurality of location signals, each location signal from the plurality of location signals representing a latitude-and-longitude of the mobile communication device, the code further comprising code to cause the processor to:

determine, based on a pattern of the plurality of location signals, that the first location record is a significant location record; and access business data associated with the first location record; and provide, to the content provider device, (1) an indication that the first location record is significant and (2) an indication of the business data associated with the first location record.

12. The non-transitory processor readable medium of claim 1, wherein:

the information representing the latitude-and-longitude of the mobile communication device is from a plurality of location signals, each location signal from the plurality of location signals representing a latitude-and-longitude of the mobile communication device, the code further comprising code to cause the processor to:
determine that the first geographic area is a commercial location;
select, at the compute device, a second location record from the plurality of location records based on a second location signal from the plurality of location signals mapping within a second closed shape from the plurality of closed shapes;
determine that a second geographic area from the plurality of geographic areas is a home location for the mobile communication device; and
provide, to the content provider device, an indication of the association between the mobile communication device, the commercial location, and the home location.

13. The non-transitory processor readable medium of claim 1, wherein:
the information representing the latitude-and-longitude of the mobile communication device is from a first plurality of location signals, each location signal from the first plurality of location signals representing a latitude-and-longitude of a first mobile communication device, the code further comprising code to cause the processor to:
receive, at the compute device, information representing a second plurality of location signals, each location signal from the second plurality of locations signals representing a location of a second mobile communication device;
define an association between the first mobile communication device and the second mobile communication device based on a pattern of commonalities within the first plurality of location signals and the second plurality of location signals; and
provide, to the content provider device, an indication of the association between the first mobile communication device and the second mobile communication device.

14. The non-transitory processor readable medium of claim 1, wherein:
the information representing the latitude-and-longitude of the mobile communication device is from a first plurality of location signals each location signal from the first plurality of location signals representing a latitude-and-longitude of a first mobile communication device, and
the first geographic area is a home location of the first mobile communication device, the code further comprising code to cause the processor to:
receive, at the compute device, information representing a second plurality of location signals, each location signal from the second plurality of locations signals representing a location of a second mobile communication device;
identify a home location of the second mobile communication device based on at least one location signal from the second plurality of location signals;
identify a pattern of commonalities of consumer behavior associated with the home location of the first mobile communication device and the home location of the second mobile communication device; and
provide, to the content provider device, an indication of the pattern of commonalities of consumer behavior.

15. The non-transitory processor readable medium of claim 1, wherein the information representing the latitude-and-longitude of the mobile communication device is from a plurality of location signals, each location signal from the plurality of location signals representing a latitude-and-longitude of the mobile communication device, the code further comprising code to cause the processor to:
receive information representing a plurality of information consumed by the mobile communication device over a period of time; and
determine that the first geographic area is a workplace location of a user associated with the mobile communication device based on a subset of the plurality of information consumed being associated with a subset of the plurality of location signals that map within the first closed shape, the subset of the plurality of information consumed corresponding to at least one of a predetermined workplace consumption time or a predetermined workplace information consumption pattern.

16. A method, comprising:
receiving, at a compute device, geolocation information representing a plurality of locations of a plurality of mobile communication devices;
accessing a location record database that includes a plurality of location records, each location record from the plurality of location records uniquely associated with a closed shape from a plurality of closed shapes, a first subset of location records from the plurality of location records being residential location records;
associating each mobile communication device from the plurality of mobile communication devices with a corresponding location record from a second subset of location records from the plurality of location records based on a match between received geolocation information of the mobile communication device and a closed shape associated with the corresponding location record from the second subset of location records, wherein a first mobile communication device from the plurality of mobile communication devices being associated with a first location record from the second subset of location records based on a match between received geolocation information of the first mobile communication device and a first closed shape associated with the first location record;
identifying a pattern of common content consumption across a subset of the plurality of mobile communication devices;
accessing a plurality of household database records;
associating, at the compute device, a household database record from the plurality of household database records with each location record from the first subset of location records, a first household database record from the plurality of household database records being associated with the first location record;
identifying a pattern of common household data within the first subset of location records;
providing, to a content provider, an indication of the pattern of common household data;
sending information from the compute device to the first mobile communication device based, at least in part, on the first household database record and the first mobile communication device each being associated with the first location record; and
sending, from the compute device, a signal representing household data associated with the first location record, wherein an effectiveness of the information sent to the first mobile communication device is measured based, at least in part, on a plurality of transaction records associated with the first location record.

17. The method of claim 16, further comprising:
receiving an indication of data associated with the first mobile communication device indexed by a user identifier, the association between the first mobile communication device and the first household database record unifying the data indexed by the user identifier and the first household database record, which is indexed by street address.

18. The method of claim 16, further comprising determining that the first location record is significant, the signal representing household data associated with the first location record including an indication that the first location record is significant.

19. The method of claim 16, further comprising:
identifying a pattern from the geolocation information indicating that a second location record from the plurality of location records is at least one of a home, a workplace, a commonly-visited retail establishment, or a location on a common commuting route.

20. The method of claim 16, further comprising:
selecting the information sent to the first mobile communication device based on at least one of household income identified in the first household database record, household tax data identified in the first household database record, household composition identified in the first household database record, or household demographics identified in the first household database record.

21. The method of claim 16, wherein the effectiveness of the information sent to the first mobile communication device is measured based on a transaction record from the plurality of transaction records indicating that an item associated with the information was purchased.

22. The method of claim 16, the method further comprising:
associating, at the compute device, the first mobile communication device with a second location record from the plurality of location records based on geolocation information received for the first mobile communication device mapping within a second closed shape from the plurality of closed shapes associated with the second location record; and
sending, from the compute device, a signal representing the association between the first mobile communication device, the first location record, and the second location record.

23. The method of claim 16, further comprising:
associating, at the compute device, the first mobile communication device with a second location record from the plurality of location records based on a subset of the plurality of locations for the first mobile communication device mapping within a the second closed shape from the plurality of closed shapes associated with the second location record; and
calculating a significance score for the second location record based on a number of locations from the subset of the plurality of locations mapping within the second closed shape.

24. The method of claim 16, the method further comprising:
associating, at the compute device, the first mobile communication device with a second location record from the plurality of location records based on geolocation information mapping within a second closed shape from the plurality of closed shapes associated with the second location record, the second closed shape encompassing at least a portion of the first closed shape.

25. The method of claim 16, wherein each closed shape from the plurality of closed shapes is uniquely associated with a mapped region representing at least one of a commercial location or a residential location having an address.

26. The method of claim 16, wherein each closed shape from the plurality of closed shapes is uniquely associated with a mapped region representing at least one of metes and bounds of a real estate parcel, a 3-dimensional structure associated with a footprint and height of an office space, or a footprint of a leased space in a multi-tenant structure.

27. The method of claim 16, the method further comprising:
associating, at the compute device, the first mobile communication device with a second location record from the plurality of location records based on a subset of the plurality of locations for the first mobile communication device mapping within a second closed shape from the plurality of closed shapes associated with the second location record;
calculating a significance score for the second location record based on a number of locations from the subset of the plurality of locations mapping within the second closed shape; and
determining that the second location is an insignificant location based on the significance score being below a predetermined threshold, the association between the first mobile communication device and the second location record discarded based on the association between the first mobile communication device and the second location record being insignificant such that resources are not expended analyzing insignificant associations.

* * * * *